United States Patent [19]
King et al.

[11] Patent Number: 5,265,013
[45] Date of Patent: Nov. 23, 1993

[54] COMPENSATION OF COMPUTED TOMOGRAPHY DATA FOR X-RAY DETECTOR AFTERGLOW ARTIFACTS

[75] Inventors: Kevin F. King, New Berlin; Carl R. Crawford, Milwaukee, both of Wis.

[73] Assignee: General Electric Company, Milwaukee, Wis.

[21] Appl. No.: 615,777

[22] Filed: Nov. 19, 1990

[51] Int. Cl.⁵ .............................................. G06F 15/00
[52] U.S. Cl. .............................. 364/413.21; 364/413.2
[58] Field of Search ........... 364/413.19, 413.2, 413.21, 364/724.01, 724.12, 728.01, 819, 825

[56] References Cited

U.S. PATENT DOCUMENTS

| | | | |
|---|---|---|---|
| 4,112,303 | 9/1978 | Brandt | 250/445 T |
| 4,115,695 | 9/1978 | Kelman | 250/445 T |
| 4,494,141 | 1/1985 | Altekruse | 358/111 |
| 4,583,240 | 4/1986 | Gatten et al. | 378/19 |
| 4,636,641 | 1/1987 | Mori et al. | 250/327.2 |
| 4,674,045 | 6/1987 | Kerber et al. | 364/413.2 |
| 4,707,607 | 11/1987 | Whetten | 250/358 |
| 4,747,973 | 5/1988 | Cusano et al. | 252/301.4 R |
| 4,831,598 | 5/1989 | Koike et al. | 367/7 |
| 5,073,858 | 12/1991 | Mills | 364/413.13 |
| 5,128,864 | 6/1992 | Waggener et al. | 364/413.21 |
| 5,140,520 | 8/1992 | Matsumura | 364/413.21 |
| 5,142,286 | 8/1992 | Ribner et al. | 341/143 |

FOREIGN PATENT DOCUMENTS 0223545 11/1986 European Pat. Off. .
0353299 12/1987 European Pat. Off. .

Primary Examiner—Roy N. Envall, Jr.
Assistant Examiner—Stephen Tkacs
Attorney, Agent, or Firm—Quarles & Brady

[57] ABSTRACT

An x-ray CT system has a detector which revolves about the object being imaged to acquire attenuation data from many different angles through a range of at least 180°. The response of the detector has a time lag which as the detector revolves tends to blur the attenuation data. The acquired data is compensated for the resolution degradation by convolving the data with a function that is the inverse of a response function of the detector. An image can be reconstructed from this compensated data. However, this compensation process tends to reintroduce noise that was reduced by the blurring. As a result, a modified version of the detector response function is applied to the compensated data to reduce the noise without degrading the image resolution to an unacceptable level.

12 Claims, 3 Drawing Sheets

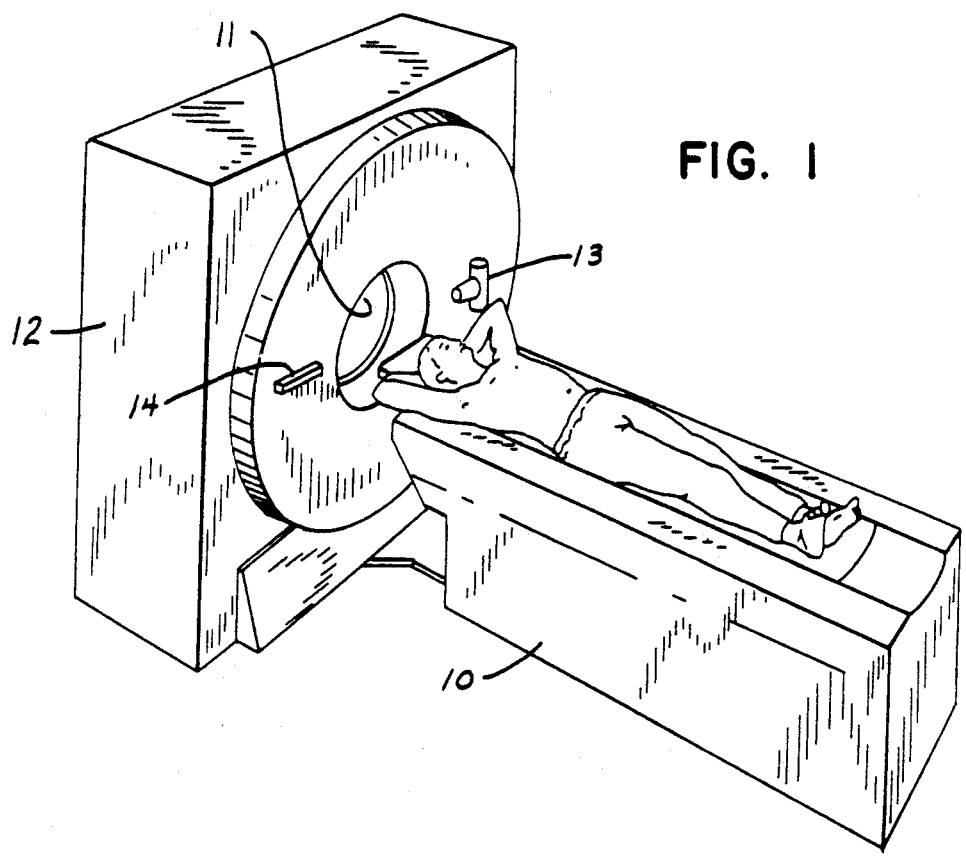
FIG. 1
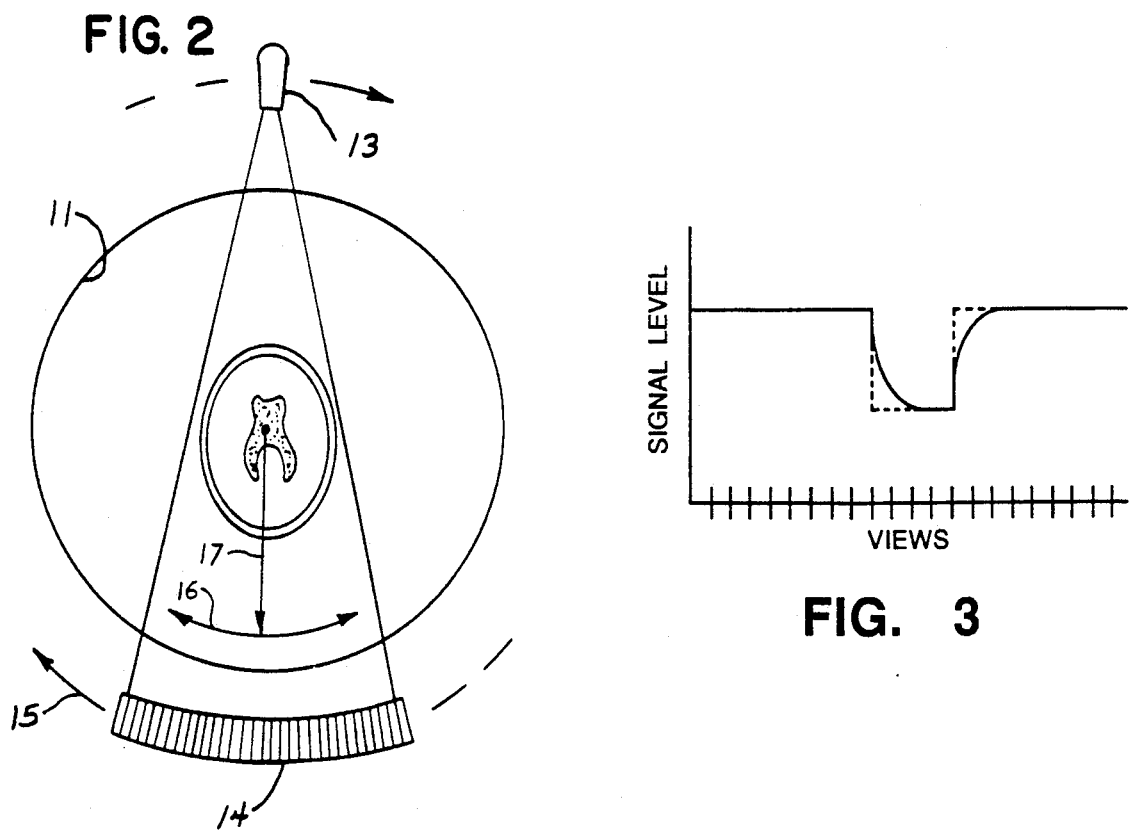
FIG. 2
FIG. 3

COMPENSATION OF COMPUTED TOMOGRAPHY DATA FOR X-RAY DETECTOR AFTERGLOW ARTIFACTS

BACKGROUND OF THE INVENTION

The field of the present invention is computed tomography and, particularly, computer tomography (CT) scanners used to produce medical images from X-ray attenuation measurements.

As shown in FIG. 1, a CT scanner used to produce images of the human anatomy includes a patient table 10 which can be positioned within the aperture 11 of a gantry 12. A source of highly collimated X-rays 13 is mounted within the gantry 12 to one side of its aperture 11, and one or more detectors 14 are mounted to the other side of the aperture. The X-ray source 13 and detectors 14 are revolved about the aperture 11 during a scan of the patient to obtain X-ray attenuation measurements from many different angles about the patient.

A complete scan of the patient is comprised of a set of X-ray attenuation measurements which are made at discrete angular orientations of the X-ray source 13 and detector 14. Each such set of measurements is referred to in the art as a "view" and the results of each such set of measurements is a transmission profile. As shown in FIG. 2, the X-ray source 13 produces a fan-shaped beam which passes through the patient and impinges on an array of detectors 14. Each detector 14 in this array produces a separate attenuation signal and the signals from all the detectors 14 are separately acquired to produce the transmission profile for the indicated angular orientation. The X-ray source 13 and detector array 14 are then revolved in direction 15 to a different angular orientation where the next transmission profile is acquired.

As the data is acquired for each transmission profile, the signals are sampled, filtered and stored in a computer memory. The signal from the detectors are oversampled to provide twice the number of transmission profiles as are required to reconstruct an image, for example. The attenuation measurement samples then are digitally low-pass filtered and the output of the filtering is sampled at a rate that produces the required number of transmission profiles from which to reconstruct an image. These steps are performed in real time as the data is being acquired.

The resultant transmission profiles then are used to reconstruct an image which reveals the anatomical structures in a slice taken through the patient. The prevailing method for reconstructing image is referred to in the art as the filtered back projection technique. The attenuation measurements are converted to integers called "CT numbers" or "Hounsfield units", which are used to control the brightness of a corresponding pixel on a CRT display.

Each X-ray detector 14 comprises a scintillator and a solid state photodiode. X-rays striking the scintillator produce light photons which are absorbed by the photodiode creating an electric current. The light is not emitted by the scintillators instantaneously, rather the emission follows a multi-exponential decay curve. In fact, the time dependence of the emitted light intensity can be modelled accurately as a sum of exponentials with different decay constants. The term "primary speed" refers to the most prompt of these exponential decays and is defined as the time in which the detector light output falls to 1/e of its initial value after being stimulated by an impulse of X-rays.

As the detector array is rapidly rotating about the patient, the exponential decay blurs together detector readings for successive views. This blurring, due to the response time lag of the detector, is referred to as "afterglow" and degrades the azimuthal component of the image resolution. The azimuthal direction 16 of the image area is perpendicular to a line 17 from the center of the imaging aperture 11. The amount of blurring increases the farther the object is spaced from the aperture center, since the speed at which the object is swept across the detectors 14 effectively increases with this spacing.

FIG. 3 plots attenuation values from a given detector for a series of views and graphically depicts the blurring. The solid line represents the output of a single detector 14 during several views for a square object being imaged. Ideally the detector data should have a pulse-like shape as represented by the dashed lines. However, the effect of the afterglow blurring rounds the edges of the waveform and extends the object signal into several adjacent views. When the views are used to reconstruct an image, the object will appear enlarged and will not have sharp, distinct edges.

An obvious solution to the resolution degradation is to slow the rotational speed of the x-ray source and detectors. However, this prolongs image acquisition and discomfort to the patient. Heretofore, a certain level of degradation has been tolerated, but as rotational scan periods become shorter, approaching one second for example, the image degradation reaches unsatisfactory levels.

Another solution is to cause the detector to emit light quicker, e.g. build a better detector. As is well known in the art, the quantity of light emitted normally decreases with the speed of its emission. The decrease in the quantity of light results in greater statistical fluctuation in the detector output, causing a noisier image. It should be noted that this alternative solution would introduce noise into the image data to the same extent as the deconvolution technique of the present invention, when electronic noise is negligible compared to quantum noise.

SUMMARY OF THE INVENTION

The present invention relates to a technique for compensating transmission profile data which is used to reconstruct an image, and more particularly for altering the transmission profile data to offset the effects due to afterglow of the image detectors.

The output signal from an x-ray detector can be expressed as the transmission profile data produced by an ideal detector convolved with a first kernel that represents the detector response to the radiation. Thus data from a given detector can be compensated for the afterglow effects by determining a kernel that is mathematically inverse to the first kernel and convolving the inverse kernel with the actual detector data to derive ideal transmission profile data.

Since the afterglow effect which degrades the resolution also attenuates noise in the image, the compensation process tends to reintroduce the noise into the transmission profile data. Thus it may be desirable only to partially compensate for the afterglow effects. In this case, a modified version of the first kernel can be convolved with the derived ideal transmission profile data to apply a partial afterglow effect to that data which degrades the resolution within tolerable limits, but which sufficiently attenuates the noise to produce an acceptable image upon reconstruction.

An object of the present invention is to provide a method of countering the effects of detector afterglow on a CT scanner image.

A further object of the present invention is to provide a method of countering the effects of detector afterglow on a CT scanner image without significantly reintroducing noise into the image data.

Another object is to provide a detector signal processing technique which enables faster image scanning with conventional detectors without appreciable image resolution degradation.

BRIEF DESCRIPTION OF THE DRAWINGS

FIG. 1 is a perspective view of a CT system in which the present invention may be employed;

FIG. 2 is a schematic representation of a scanning technique employed in the CT system of FIG. 1;

FIG. 3 is a graph illustrating the detector readings for an ideal detector and an actual detector which has resolution degradation due to afterglow;

DESCRIPTION OF THE PRESENT INVENTION

Figure 4:
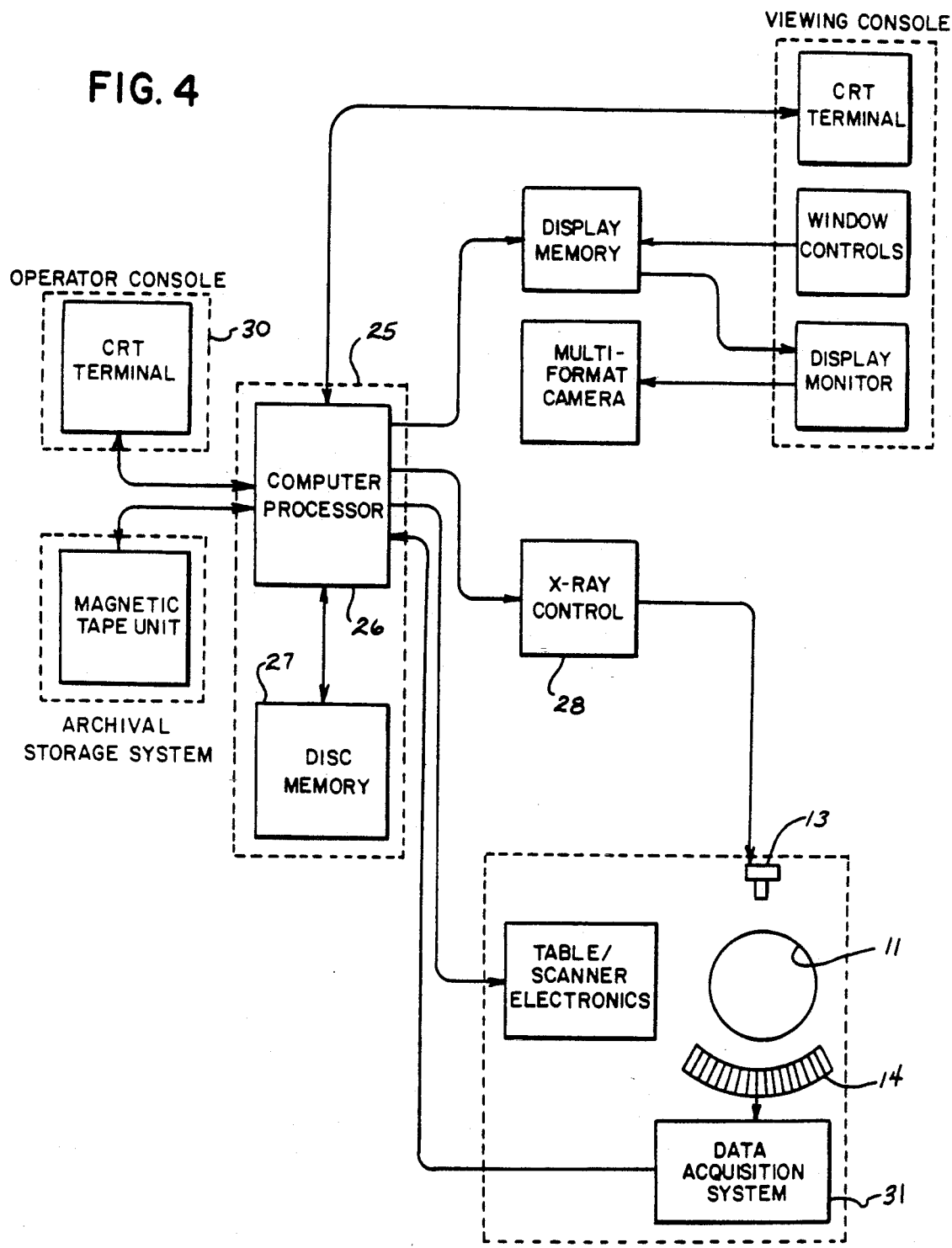
FIG. 4 is a block diagram of the CT system of FIG. 1.

Referring to FIGS. 1, 2 and 4, the operation of the CT system is controlled by a programmed data processing system 25 which includes a computer processor 26 and a disc memory 27. The disc memory 27 stores the programs that the computer processor 26 uses in patient scanning and in image reconstruction and display. It also stores on a short-term basis the acquired data and the reconstructed image data. The computer processor 26 includes a general purpose minicomputer with input and output ports suitable for connection to the other system elements as shown and an array processor such as that disclosed in U.S. Pat. No. 4,494,141. The description of the array processor in this patent is incorporated herein by reference.

An output port on the computer processor 26 connects to an X-ray control circuit 28, which in turn controls excitation of the X-ray source 13. The high voltage on the X-ray source 13 is controlled and its cathode current is regulated to provide the correct dosage. The high voltage and cathode current are selected by an operator who enters the desired values through an operator console 30 and the computer processor 26 directs the production of the X-rays in accordance with its scan program.

The X-rays are dispersed in a fan-shape as described above and received by the array of detectors 14 mounted on the opposite side of the gantry aperture 11. Each individual detector examines a single ray originating from the X-ray source 13 and traversing a straight line path through a patient located in the aperture 11. The detector array also includes a group of reference detectors at each of its ends that receive unattenuated X-rays from the source 13. The currents formed in each detector 14 are collected as an analog electrical signal and converted into a digital number by analog to digital converters in a data acquisition system 31. The signals are digitized sequentially starting at one end of the detector array and finishing at the other end. The digitized signals are input to the computer processor 26. The digitized measurements from all the detectors is a complete view.

U.S Pat. Nos. 4,112,303 and 4,115,965 disclose details of the gantry construction, U.S. Pat. No. 4,707,607 discloses the details of the detector array 14, and the data acquisition system is disclosed in U.S. Pat. No. 4,583,240. The descriptions of the components in these patents are incorporated herein by reference.

Figure 5:
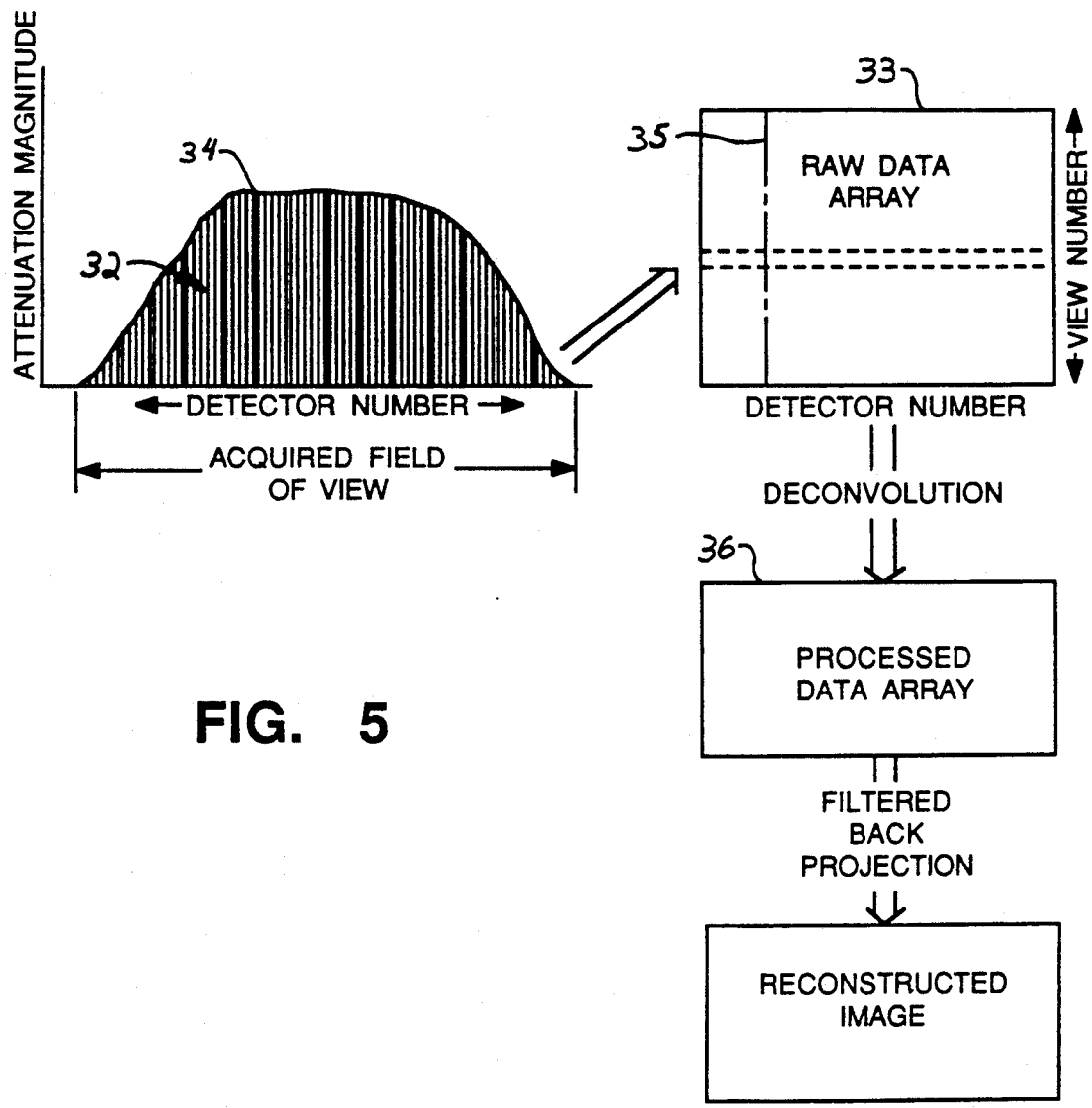
FIG. 5 is a pictorial representation of data which is acquired and processed by the CT system of FIG. 1.

The digitized attenuation measurements from the data acquisition system 31 are preprocessed in a well known manner to compensate for "dark currents", for uneven detector sensitivities and gains, and for variations in X-ray beam intensity throughout the scan. This is followed by beam hardening corrections and conversion of the data to logarithmic form so that each measured value represents a line integral of the X-ray beam attenuation. This preprocessing is performed in real time as the scan is being conducted and, as shown in FIG. 5, the attenuation values 32 in each view are stored on one row of a two-dimensional raw data array 33. As indicated by the dashed line 34, each such row of attenuation data provides a transmission profile of the object to be imaged when viewed from a single angle.

At the completion of the scan, the raw data array 33 stores, on each of its rows, a transmission profile 34 from one view. One dimension of this array 33 is, therefore, determined by the number of views which are acquired in the scan and the other dimension is determined by the number of detector signals which are acquired during each view. The number of detector signals which are acquired determines the acquired field of view. In the preferred embodiment, this includes up to 852 detector signals. Each detector signal produces data samples along a vertical line, such as line 35, through the raw data array.

The raw data stored in array 33 has been corrupted by the afterglow effect caused by the response time lag of each detector. If these raw data are used in a previous CT system to reconstruct an image, features of the image would be blurred as described previously. However, the present system provides a mechanism which compensates for the azimuthal resolution degradation due to the afterglow effects.

In order to determine a correction mechanism for the image blurring, one must understand the afterglow effect. The actual output of each detector y(t) is given by the expression:

$$y(t) = x(t) * g(t) \qquad (1)$$

where x(t) represents an the output from an ideal detector, * is the symbol for convolution and g(t) represents the detector response. The detector response g(t) is measured by turning on the x-ray source 13, abruptly shutting off the source and measuring the output of the detectors 14. The convolution is apparent from the graphical depiction in FIG. 3 of a set of readings from a detector.

Equation (1) suggests that a mathematical means of removing the degradation caused by the detector afterglow could consist of convolving the attenuation values for each detector with a function h(t) which is the inverse of the detector's response function g(t). This relationship is given by the expression:

$$g(t) * h(t) = \delta(t). \qquad (2)$$

where $\delta(t)$ is the Dirac delta function. Thus the raw data could be corrected by the deconvolution:

$$x(t) = y(t) * h(t). \tag{3}$$

If the detector response function g(t) is considered as a convolution kernel, then the function h(t) is its inverse convolution kernel.

The response of the detector g(t) is given by:

$$g(t) = \sum_{i=1}^{j} a_i e^{-t/\tau_i} \tag{4}$$

where j is the number of the decay time constants, and $a_i$ is the fraction of the light emitted within the detector with a decay time constant $\tau_i$. The measured data for a detector response g(t) can be fit into the form of Equation (4) using a numerical method, such as the least squares technique. The shortest of the decay time constants is referred to as the "primary speed decay time constant" and usually accounts for most of the emitted light, as well as most of the resolution degradation. If only the primary speed decay time constant $\tau$ is considered the response of the detector g(t) reduces to:

$$g(t) = \frac{1}{\tau} e^{-t/\tau} \tag{5}$$

Equation (5) assumes that the signal from each detector 14 is continuous. However, each detector signal is periodically sampled and digitized into separate views in order to process the signal and reconstruct the image using digital circuits and computers. As a consequence each detector output signal is not continuous, but is a series of discrete attenuation values.

Considering only the primary speed decay time constant, the attenuation value $y_n$ read from a detector for view number n can be represented by expanding the convolution expression of Equation (1) as:

$$y_n = y_{n-1} e^{-\Delta t/\tau} + x_n (1 - e^{-\Delta t/\tau}) \tag{6}$$

where $\Delta t$ is the time between views and $y_{n-1}$ represents the actual detector attenuation value for the previous view.

Equation (6) shows that the degraded actual detector attenuation value $y_n$ effectively results from recursive filtering the ideal attenuation value $x_n$. Conversely, the ideal attenuation value $x_n$ may be obtained by a two term deconvolution of the degraded attenuation values, as given by the expression:

$$x_n = \frac{y_n - y_{n-1} e^{-\Delta t/\tau}}{1 - e^{-\Delta t/\tau}} \tag{7}$$

It follows that the function given by Equation (7) can be applied to the raw x-ray attenuation values to produce an array of attenuation values which have been corrected for the effects of detector afterglow. This mathematical operation essentially convolves the raw x-ray attenuation values with the inverse function of the x-ray detector response function. With reference to FIGS. 4 and 5, the sets of views for each detector stored in array 33 are processed by the computer processor 26 according to Equation (7) to produce corresponding sets of corrected views. As a corrected attenuation value for each view is produced, it is stored in the disc memory 27 as an element of a corrected data array 36.

The corrected attenuation values in the corrected data array 36, then are processed in a conventional manner, such as by back projection, to reconstruct the image.

The azimuthal resolution degradation of the image due to the detector afterglow has a beneficial side effect in that noise also is diminished. The image noise is a composite of quantum noise from the detector and electronic noise introduced by the data acquisition system. As with the resolution degradation, the degree of noise attenuation that results from detector afterglow is a function of the distance from the center of the imaging aperture 11. Compensating for azimuthal resolution degradation has the adverse effect of counteracting this noise attenuation, thus reintroducing noise into the detector data.

Deconvolution as a general mathematical process is well understood. Also well known is that the deconvolution process adds noise into signal data. Thus the process is not generally accepted for signal processing, since the added noise can have as adverse an affect on the signal as the effect, in this case resolution degradation, that is being reduced by the deconvolution. The present inventors have discovered that the quantum noise from the detector is the predominant noise component in the attenuation data and that the electronic noise is negligible in comparison. Thus when the actual detector signal data is deconvolved, the noise added into the data is no greater than would be present in data from a perfect detector. Therefore, although conventional wisdom teaches otherwise, the present inventors recognized that deconvolution has practical application in countering the afterglow effects from CT scanner detectors.

In some applications, where resultant image noise is negligible, the fully corrected data can be used directly to reconstruct the image. However, typically an image that is reconstructed directly from the fully corrected attenuation values, while being much sharper, will have an unacceptable level of noise. Thus, it is preferable to limit the degree of afterglow compensation in a tradeoff between azimuthal resolution and image noise.

A solution to the reintroduction of image noise is to provide less than total compensation for the afterglow affects. In this case, the reconstructed image will be sharper than without any correction, yet the noise still will be attenuated to an acceptable level. To accomplish this, the raw data still is processed as described above to produce an array of fully corrected attenuation values. The corrected values then are further processed to insert a limited degree of resolution degradation sufficient to blur the noise, but not so extreme as to unacceptably affect the resolution. The noise reduction is performed by processing the fully corrected data according to the function given by the Equation (6). However a value for the decay time constant $\tau$ is used that is a fraction of the decay time constant value used in the deconvolution process which produced the fully corrected attenuation values. Preferably one-half the original value of the decay constant $\tau$ is used in applying Equation (6) to the fully corrected data. This subsequent step simulates noise from a slightly faster detector. In a similar procedure to the manner in which the fully corrected attenuation values were produced, those values are read from the array in disc memory 27, processed by the computer processor 25 according to Equation (6) and stored as another array of semi-corrected attenuation values. The semi-corrected attenuation values then are used in the conventional manner to reconstruct an image.

It may also be possible to convert the two step process of deconvolution-convolution into a single deconvolution step, in which the kernel used for deconvolution is a modified inverse function of the detector response. Thus the deconvolution does not produce the data that would originate from an ideal detector, rather data that would be produced from a slightly faster detector than was actually used, i.e. the equivalent of the semi-corrected attenuation values discussed above.

Alternatively, the deconvolution process can be incorporated as part of the preprocessing performed by the Data Acquisition System 31. As discussed above the actual detector signal $y_n$ is effectively a recursive filtered ideal detector signal $x_n$. The inverse of a recursive filter function is an infinite impulse response. However, experiments have determined that a finite impulse response filter may be substituted for an infinite impulse response in the Data Acquisition System 31. In this embodiment of the present invention, the afterglow compensation is performed as a component of the digital filtering step which is part of the process that produces the raw data array 33.

It is further understood that although several preferred embodiments of the present invention have been described, it is understood that various modifications and changes may be made without departing from the spirit and scope of this invention. For example, although the invention has been described in the context of a third generation CT scanner, the invention has equal application to fourth generation CT scanners that have a stationary detector array encircling the imaging aperture and a revolving x-ray source.

We claim:

1. A method for producing an image with a CT system the steps comprising:
    acquiring a set of attenuation values from a radiation detector;
    convolving the set of attenuation values with a function that is substantially the inverse of only a portion of an impulse response function of the radiation detector which portion corresponds to a function having a decay constant corresponding to a primary speed of the radiation detector, said convolving producing a second set of values; and
    reconstructing an image from values produced by said convolving step.

2. The method for producing an image as recited in claim 1 wherein said reconstructing step forms an image by back projecting the second set of values.

3. A method for producing an image with a CT system, the steps comprising:
    acquiring a set of attenuation values from a radiation detector;
    convolving the set of attenuation values with a function that is substantially the inverse of an impulse response function of the radiation detector, said convolving producing a second set of values;
    convolving the second set of values with a function derived from the impulse response function of the radiation detector to produce a third set of values; and
    reconstructing an image from the third set of values.

4. The method for producing an image as recited in claim 3 wherein said reconstructing step forms an image by back projecting the third set of values.

5. A method for producing an image with a CT system the steps comprising:
    acquiring a first set of x-ray attenuation values by periodically sampling at an interval $\Delta t$ a signal produced by an x-ray detector, where $y_n$ designates a specific x-ray attenuation value;
    producing a second set of data values from the first set of x-ray attenuation data values, in which each data value $x_n$ is given by the function:

$$x_n = \frac{y_n - y_{n-1} e^{-\Delta t/\tau}}{1 - e^{-\Delta t/\tau}}$$

where $\tau$ is a response decay time constant of the x-ray detector; and
    reconstructing an image by a back projection technique based on the second set of data values.

6. The method for producing an image as recited in claim 5 wherein $\tau$ is a response decay time constant of the x-ray detector which is of shortest duration.

7. The method for producing an image as recited in claim 5 further comprising:
    producing a third set of data values in which each data value $z_n$ is given by the function:

$$z_n = z_{n-1} e^{-\Delta t/\tau'} + x_n(1 - e^{-\Delta t/\tau'})$$

where
    $\tau'$ is a fraction of the response decay time constant $\tau$ of the x-ray detector; and
    wherein said step of reconstructing an image comprises back projecting the third set of data values.

8. The method for producing an image as recited in claim 7 wherein $\tau'$ is substantially one-half the response decay time constant $\tau$.

9. A method for producing an image with a CT system having a detector that exhibits an afterglow phenomenon, the steps comprising:
    acquiring a signal from a detector that is indicative of an amount of radiation passing through an object;
    digitally sampling the signal from a detector to produce a plurality of n attenuation values, where n is a positive integer;
    filtering the attenuation values with a digital finite impulse response filter to compensate for the effects due to the afterglow phenomenon;
    digitally sampling results of said filtering step to produce a plurality of attenuation samples, in which the number of attenuation samples is given by the mathematical expression n/m, where m is an positive integer; and
    reconstructing an image from the attenuation samples.

10. The method for producing an image as recited in claim 9 wherein said filtering step further includes filtering the attenuation values with a digital low-pass filter.

11. The method for producing an image as recited in claim 9 wherein said reconstructing step forms an image by back projecting the attenuation samples.

12. The method for producing an image as recited in claim 9 wherein m has a value greater than one.

* * * * *